US010028489B1

(12) United States Patent
Smith, Jr.

(10) Patent No.: US 10,028,489 B1
(45) Date of Patent: Jul. 24, 2018

(54) ANIMAL WASTE DISPOSAL DEVICE

(71) Applicant: Jimmy Levon Smith, Jr., Vacaville, CA (US)

(72) Inventor: Jimmy Levon Smith, Jr., Vacaville, CA (US)

( * ) Notice: Subject to any disclaimer, the term of this patent is extended or adjusted under 35 U.S.C. 154(b) by 0 days.

(21) Appl. No.: 15/461,425

(22) Filed: Mar. 16, 2017

Related U.S. Application Data

(60) Provisional application No. 62/309,198, filed on Mar. 16, 2016.

(51) Int. Cl.
*A45F 3/14* (2006.01)
*A01K 23/00* (2006.01)
*A45F 3/00* (2006.01)

(52) U.S. Cl.
CPC .............. *A01K 23/005* (2013.01); *A45F 3/00* (2013.01); *A45F 2003/003* (2013.01); *A45F 2003/006* (2013.01)

(58) Field of Classification Search
CPC ... A01K 23/005; A45F 3/00; A45F 2003/006; A45F 2003/003
USPC ................................. 224/222, 218, 219, 221
See application file for complete search history.

(56) References Cited

U.S. PATENT DOCUMENTS

| 3,199,754 | A | * | 8/1965 | Sorensen | B60N 3/12 |
|---|---|---|---|---|---|
| | | | | | 224/222 |
| 5,447,227 | A | * | 9/1995 | Kosberg | A01K 1/035 |
| | | | | | 206/223 |
| 5,465,889 | A | * | 11/1995 | Smith | A45F 3/00 |
| | | | | | 224/235 |
| 5,713,616 | A | * | 2/1998 | Knudson | E01H 1/1206 |
| | | | | | 206/223 |
| 6,199,737 | B1 | * | 3/2001 | Ringelstetter | E01H 1/1206 |
| | | | | | 150/108 |
| 6,257,473 | B1 | * | 7/2001 | Ringelstetter | E01H 1/1206 |
| | | | | | 119/795 |
| 6,662,985 | B2 | * | 12/2003 | Harada | A45F 5/02 |
| | | | | | 224/661 |
| 7,073,462 | B1 | * | 7/2006 | Layman | A01K 27/006 |
| | | | | | 119/161 |
| 7,931,170 | B2 | * | 4/2011 | Che | B65H 35/10 |
| | | | | | 206/233 |
| 8,985,421 | B2 | * | 3/2015 | Barbier | A45C 11/00 |
| | | | | | 224/222 |
| D771,323 | S | * | 11/2016 | Whitefield | D30/153 |
| 2004/0173648 | A1 | * | 9/2004 | Avazpour | A45F 3/00 |
| | | | | | 224/219 |
| 2004/0222650 | A1 | * | 11/2004 | Colesanti | E01H 1/1206 |
| | | | | | 294/1.3 |
| 2004/0251285 | A1 | * | 12/2004 | O'Neill | A45F 5/00 |
| | | | | | 224/221 |

(Continued)

*Primary Examiner* — Nathan J Newhouse
*Assistant Examiner* — Lester L Vanterpool
(74) *Attorney, Agent, or Firm* — RG Patent Consulting, LLC; Rachel Gilboy

(57) ABSTRACT

An improved animal waste disposal device is an expandable container that attaches to a pet owner's lower leg via hook and loop straps, for carrying animal waste. The device has a separate attached lower compartment for holding a roll of plastic bags for holding the waste, that are individually dispensed through a slot in its front cover. The front and the top of the top waste compartment hinges at the outer bottom edge and pivots outwardly, remaining attached to the back side with accordion style sides that attach to the front and back sides.

9 Claims, 4 Drawing Sheets

(56) References Cited

U.S. PATENT DOCUMENTS

| | | | |
|---|---|---|---|
| 2010/0206924 A1* | 8/2010 | Brown | A45F 3/14 224/222 |
| 2012/0186539 A1* | 7/2012 | Johnston | A01K 27/004 119/796 |
| 2016/0052712 A1* | 2/2016 | Jackson-Tyree | E01H 1/1206 294/1.3 |
| 2016/0135432 A1* | 5/2016 | Cox | A01K 27/008 119/795 |

* cited by examiner

US 10,028,489 B1

ANIMAL WASTE DISPOSAL DEVICE

CROSS-REFERENCE TO RELATED APPLICATION

The present application is related to and claims priority from prior provisional application Ser. No. 62/309,198, filed Mar. 16, 2016 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of container device for animal waste and more specifically relates to an improved animal waste disposal device.

2. Description of the Related Art

Modern subdivisions in cities are designed to be the most appealing aesthetically to maintain appeal for prospective property buyers and to maintain property value for the owners of properties within these subdivisions. They typically have numerous parks, playgrounds, and concrete walking trails as well as being maintained by landscape crews. The rules for living in these subdivisions can sometimes be very stringent, but for the purpose of maintaining property values. Among the rules established by nearly all subdivisions and city ordinances is the requirement for pet owners to pick up their pet's excrement. Even in these subdivisions that have that as a requirement, many pet owners do not because it is an unpleasant business at best. Usually, the pet owner carries a plastic bag around when the pet is walked and place the bag over the hand when needed to grab the feces and turn the bag inside out. The owner then has to carry the bag around until a disposal site is reached. This can be not only unpleasant, but embarrassing. An innovation to reduce the unpleasantness and the embarrassment is needed.

Various attempts have been made to solve the problems which may be found in related art but have thus far been unsuccessful. None of the prior art taken either singly or in combination, is seen to describe the invention as claimed.

Ideally, a container device for animal waste should provide the convenience of hands fee carrying, and yet, would operate reliably and be manufactured at a modest expense. Thus, a need exists for a reliable improved animal waste disposal device to avoid the above-mentioned problems.

BRIEF SUMMARY OF THE INVENTION

In view of the foregoing disadvantages inherent in the known container device for animal waste art, the present invention provides a novel improved animal waste disposal device. The general purpose of the present invention, which will be described subsequently in greater detail, is to provide the convenience of hands fee carrying.

The improved animal waste disposal device preferably comprises a storage container section that includes a back panel adapted to be releasably attached to an appendage of a user, a bottom panel connected to the back panel that extends outwardly therefrom, and a removable cover including a front panel and at least one side panel connected to the front panel. The removable cover is pivotally connected to the bottom panel with a flexible hinge-like structure and is adapted to be removably connected to the back panel in such a way that an interior volume is formed by the back panel, bottom panel, and the removable cover.

The interior volume is removably covered, is accessible, and can be used to removably store bags of animal waste therein. At least one strap member is connected to the back panel and is used to removably attach the improved animal waste disposal device to the appendage, preferably the lower leg, of the user. A storage container is removably attached to the bottom surface of the bottom panel forming an interior volume adapted to store un-used animal waste bags inside.

The storage container also includes an aperture adapted to allow the animal waste bags to be pulled therethrough, and has a section that includes two expandable and spaced side members connected between the back panel and the removable cover that is adapted to form interior side panels when the removable cover is pivoted away from the back panel thereby allowing access to the interior volume. The two expandable and spaced side members are formed from a material folded in an accordion-style and expands when the removable cover is placed in an open configuration and contracts when the removable cover is placed in a closed configuration.

The removable cover further includes at least one but preferably two releasable connectors made of hook and loop material attached to the side panels that are adapted to releasably connect with the back panel to thereby removably and securely hold the removable cover in a closed configuration. The strap members are formed from two strap portions respectively connected to the back panel member at proximal ends and releasably attachable together at distal ends thereof via a releasable connector member.

A plurality of animal waste bags is able to be stored within the storage container. The animal waste bags can be stored individually or may be stored on a roll held by a waste bag roll holder member that is able to rotatably dispense a single animal waste bag at a time through the aperture. The storage container is pivotally attached to the bottom surface of the bottom panel via a releasable connector. The back panel, the bottom panel, the removable cover, and the storage container are preferably formed from a plastic material. The storage container section may further include a removable liner formed from a plastic material that is able to be placed within the interior volume that is adapted to be replaced when it becomes dirty.

The present invention holds significant improvements and serves as an improved animal waste disposal device. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, improved animal waste disposal device, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a container device for animal waste and more particularly to a improved animal waste disposal device as used to provide the convenience of hands fee carrying.

Generally speaking, the improved animal waste disposal device is an expandable container that attaches to a pet owner's lower leg via hook and loop straps, for carrying animal waste. The device has a separate attached lower compartment for holding a roll of plastic bags for holding the waste, that are individually dispensed through a slot in its front cover. The front and the top of the top waste compartment hinges at the outer bottom edge and pivots outwardly, remaining attached to the back side with accordion style sides that attach to the front and back sides.

Figure 1:
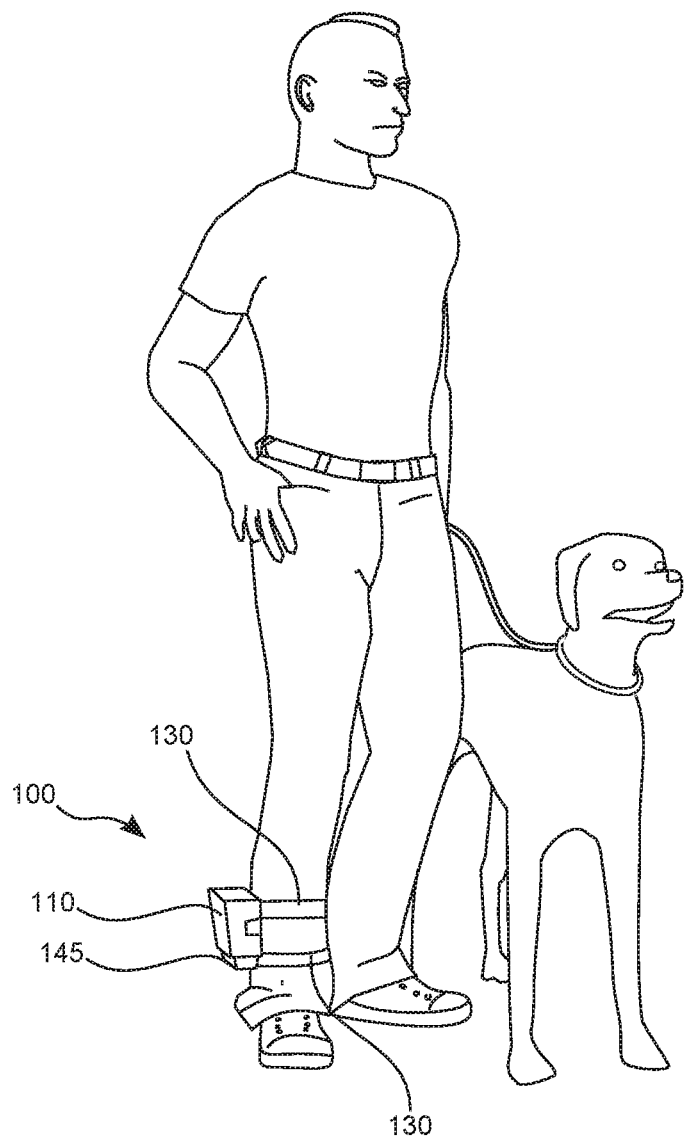
FIG. 1 shows a perspective view illustrating an in-use condition of an improved animal waste disposal device according to an embodiment of the present invention.

In greater detail now, referring to the drawings by numerals of reference there is shown in FIG. 1, a perspective view illustrating an in-use condition of improved animal waste disposal device 100 according to an embodiment of the present invention.

Improved animal waste disposal device 100 removes the unpleasant task of carrying bags of animal feces until a disposal site is reached. It also provides dispenser 147 for animal waste bags 135 to be pulled from a spool as needed and provides a sanitary method of handling and carrying the waste. Improved animal waste disposal device 100 preferably comprises storage container section 110 that includes back panel 111 adapted to be releasably attached to an appendage of a user, a bottom panel 112 connected to back panel 111 that extends outwardly therefrom, and removable cover 115 including front panel 116 and at least one side panel 117 connected to front panel 116. Removable cover 115 is pivotally connected to bottom panel 112 with hinge 119 and is adapted to be removably connected to back panel 111 in such a way that interior volume 125 is formed by back panel 111, bottom panel 112, and removable cover 115.

Figure 2:
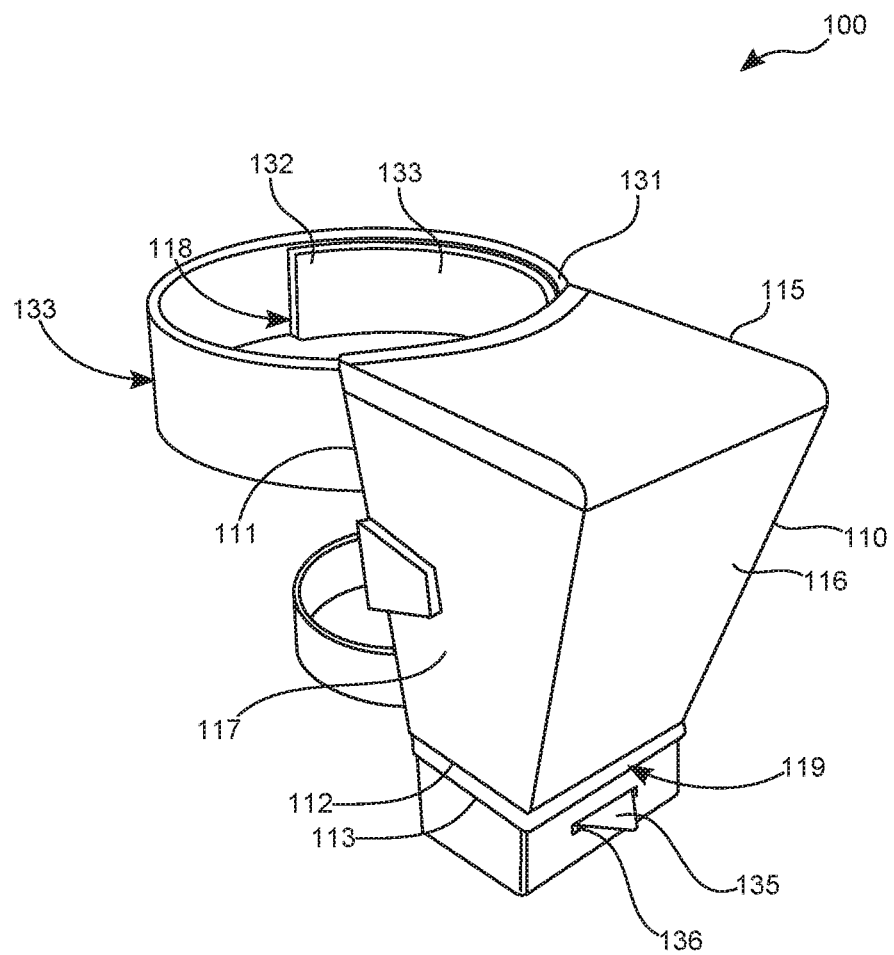
FIG. 2 is a front perspective view illustrating an improved animal waste disposal device according to an embodiment of the present invention of FIG. 1.

Referring now to FIG. 2, is a front perspective view illustrating improved animal waste disposal device 100 according to an embodiment of the present invention of FIG. 1.

The lower storage container 145 also includes aperture 136 adapted to allow animal waste bags 135 to be pulled therethrough. Removable cover 115 of the upper storage container section 110 includes at least one but preferably two releasable connectors 118 made of hook and loop material 140 attached to side panels 117 that are adapted to releasably connect with back panel 111 to thereby removably and securely hold removable cover 115 in a closed configuration. Strap members 130 are formed from two strap portions 133 respectively connected to back panel 111 at proximal ends 131 and releasably attachable together at distal ends 132 thereof via releasable connector member 140.

Figure 3:
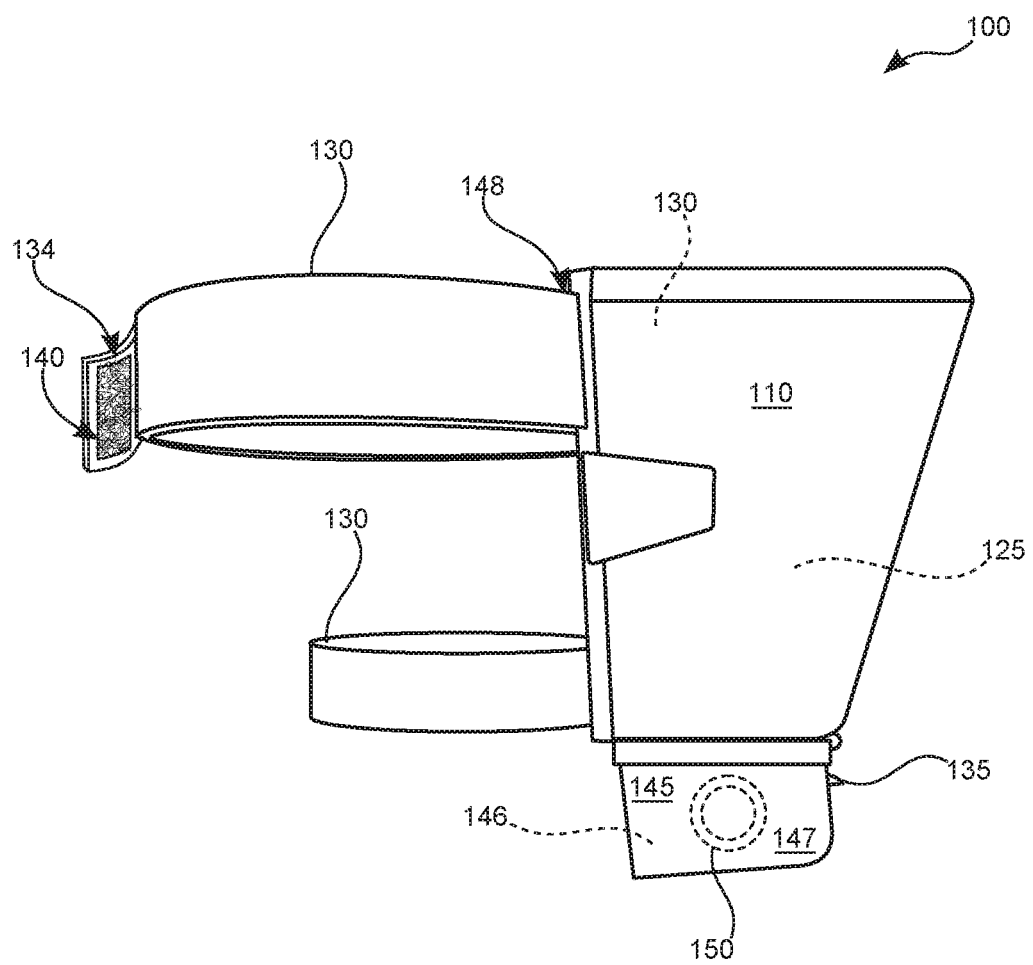
FIG. 3 is a side perspective view illustrating improved animal waste disposal device according to an embodiment of the present invention of FIG. 1.

Referring now to FIG. 3, is a side perspective view illustrating improved animal waste disposal device 100 according to an embodiment of the present invention of FIG. 1.

A plurality of animal waste bags 135 is able to be stored within storage container 145. Animal waste bags 135 can be stored individually or may be held by waste bag roll holder member 150 that is able to rotatably dispense a single animal waste bag 135 at a time through aperture 136. Storage container 145 is pivotally attached to bottom surface 113 of bottom panel 112 via releasable connector 148. Back panel 111, bottom panel 112, removable cover 115, and storage container section 110 are preferably formed from a plastic material. Storage container section 110 may further include removable liner 155 formed from a plastic material that is able to be placed within interior volume 125 that is adapted to be replaced when it becomes dirty.

Figure 4:
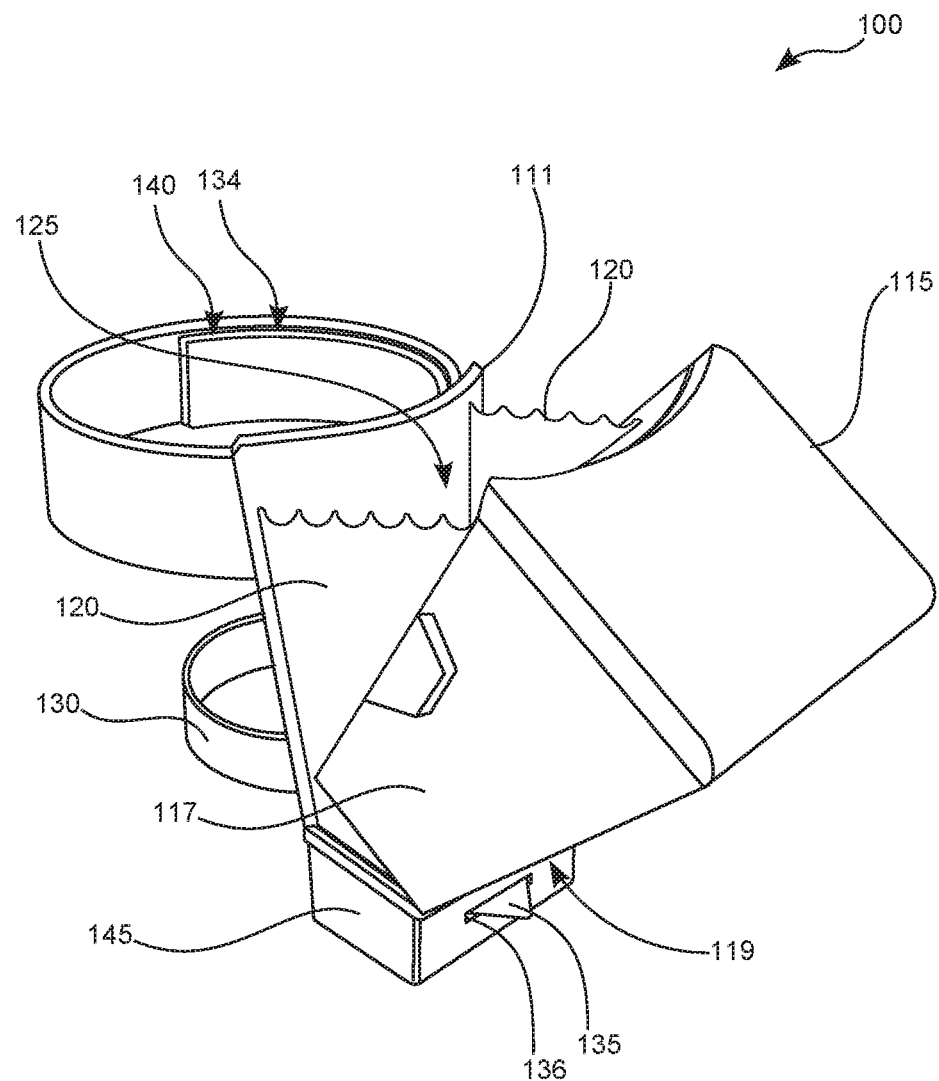
FIG. 4 is a perspective view illustrating an opened condition of the improved animal waste disposal device according to an embodiment of the present invention of FIG. 1.

Referring now to FIG. 4, showing a perspective view illustrating an opened condition of improved animal waste disposal device 100 according to an embodiment of the present invention of FIG. 1.

Interior volume 125 is removably covered, is accessible, and can be used to removably store animal waste bags 135 with animal waste therein. At least one strap member 130 is connected to back panel 111 and is used to removably attach improved animal waste disposal device 100 to the appendage, preferably the lower leg, of the user. Storage container 145 is removably attached to the bottom surface 113 of bottom panel 112 forming interior volume 125 adapted to store un-used animal waste bags 135 inside. A section that includes two expandable and spaced side members 120 is connected between back panel 111 and removable cover 115 that is adapted to form interior side members 120 when removable cover 115 is pivoted away from back panel 111 thereby allowing access to interior volume 125. The two expandable and spaced side members 120 are formed from a material folded in an accordion-style and expands when removable cover 115 is placed in an open configuration and contracts when removable cover 115 is placed in a closed configuration.

Animal waste disposal device 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed:

1. An improved animal waste disposal device comprising:
   a storage container section including;
      a back panel
         wherein said back panel is adapted to be releasably attached to an appendage of a user;
      a bottom panel
         wherein said bottom panel is connected to said back panel and extends outwardly therefrom;
      a cover including:
         a front panel; and
         at least one side panel connected to said front panel;
         wherein said cover is pivotally connected to said bottom panel; and
         wherein said cover is adapted to contact said back panel such that an interior volume is formed that is adapted to store bags of animal waste therein;
   at least one strap member;
      wherein said at least one strap member is connected to said back panel and used to removably attach said improved animal waste disposal device to said appendage of said user; and
   a storage container;
      wherein said storage container is attached to a bottom surface of said bottom panel;
      wherein said storage container forms an interior volume adapted to store animal waste bags therein; and
      wherein said storage container includes an aperture therethrough adapted to allow said animal waste bags to be pulled therethrough.

2. The improved animal waste disposal device of claim 1, wherein said storage container section further includes two expandable and spaced side members connected between said back panel and said removable cover adapted to form interior side panels when said removable cover is pivoted away from said back panel thereby allowing access to said interior volume thereof.

3. The improved animal waste disposal device of claim 2, wherein said two expandable and spaced side members are formed from a material folded in an accordion-style and expands when said removable cover is placed in an open configuration and contracts when said removable cover is placed in a closed configuration.

4. The improved animal waste disposal device of claim 1, wherein said at least one strap member is formed from two strap portions respectively connected to said back panel member at proximal ends thereof and releasably attachable together at distal ends thereof via a releasable connector member.

5. The improved animal waste disposal device of claim 4, wherein said releasable connector member is formed from hook and loop material.

6. The improved animal waste disposal device of claim 4, wherein there are two spaced releasable connector members.

7. The improved animal waste disposal device of claim 1, further comprising a plurality of animal waste bags placed within said storage container.

8. The improved animal waste disposal device of claim 7, wherein said storage container further comprises a removable animal waste bag roll holder member; wherein said plurality of animal waste bags are stored on a roll and are adapted to be removed from said roll one at a time; and wherein said roll is removably placed upon said animal waste bag roll holder member and removably placed within said storage container such that said animal waste bags can be retrieved one at a time through said aperture.

9. The improved animal waste disposal device of claim 1, wherein said back panel, said bottom panel, said removable cover, and said storage container are formed from a plastic material.

\* \* \* \* \*